(12) United States Patent
Torii et al.

(10) Patent No.: US 6,229,233 B1
(45) Date of Patent: May 8, 2001

(54) MOTOR HAVING WORM GEAR MECHANISM

(75) Inventors: Katsuhiko Torii, Hamamatsu; Hiroaki Yamamoto; Naoki Imamura, both of Kosai, all of (JP)

(73) Assignee: Asmo Co., Ltd., Shizuoka (JP)

( * ) Notice: Subject to any disclaimer, the term of this patent is extended or adjusted under 35 U.S.C. 154(b) by 0 days.

(21) Appl. No.: 09/537,234

(22) Filed: Mar. 28, 2000

(30) Foreign Application Priority Data

May 6, 1999 (JP) .................................. 11-125679

(51) Int. Cl.[7] .............. H02K 7/10; H02K 7/12; B06J 1/00

(52) U.S. Cl. .................. 310/75 R; 310/78; 192/44; 192/45; 464/169

(58) Field of Search ................... 310/75 R, 75 D, 310/79, 78; 464/169; 192/44, 45, 54.42, 54.43

(56) References Cited

U.S. PATENT DOCUMENTS

| 3,301,081 | * | 1/1967 | Kern ..................................... 464/169 |
| 4,652,781 | * | 3/1987 | Alexandru et al. .................... 310/83 |
| 5,819,583 | * | 10/1998 | Matsushima et al. ................ 74/7 E |
| 5,899,294 | * | 5/1999 | Shimizu et al. ....................... 180/44 |

FOREIGN PATENT DOCUMENTS 61-56701  12/1986  (JP) .

* cited by examiner

Primary Examiner—Burton Mullins
(74) Attorney, Agent, or Firm—Law Office of David G. Posz

(57) ABSTRACT

A motor includes a motor section, a one-way clutch and an output section. The motor section includes an armature and armature shaft, and the output section includes a worm mechanism having a worm shaft disposed coaxially with the armature shaft. The one-way clutch is disposed between the armature shaft and the warm shaft. The one-way clutch includes a couple of teeth members in engagement with each other, a plurality of rollers for controlling the teeth members, and a spring holding the rollers. The spring urges the worm shaft to separate from the armature shaft.

14 Claims, 8 Drawing Sheets

MOTOR HAVING WORM GEAR MECHANISM

CROSS REFERENCE TO RELATED APPLICATION

The present application is based on and claims priority from Japanese Patent Application Hei 11-125679 filed on May 6, 1999, the contents of which are incorporated herein by reference.

BACKGROUND OF THE INVENTION

1. Field of the Invention

The present invention relates to an electric motor having a worm mechanism, which is used in a power drive system such as a vehicle power window system.

2. Description of the Related Art

A motor used in a power window system has a speed reduction worm mechanism. The worm mechanism has a worm shaft which is coaxially linked to the armature shaft of the motor. When the motor rotates, the rotation speed of the motor is transmitted to the worm shaft and reduced by the worm mechanism. Thus, torque is increased and transmitted to a window regulator to open or close a window.

In the above stated motor, axial movement of the armature shaft and the worm shaft is not effectively restricted, resulting in vibration of the shafts.

SUMMARY OF THE INVENTION

A main object of the invention is to provide an improved motor having a worm gear mechanism which can prevent the above problem.

According to a main feature of the invention, a motor is comprised of a motor section, a clutch, and an output section. The motor section includes an armature having an armature shaft, and the output section includes a worm mechanism having a worm shaft disposed coaxially with the armature shaft, and a spring for biasing the worm shaft to separate from the armature shaft. The clutch is disposed between the armature shaft and the worm shaft and includes a stationary housing, a rotatable driving member and a rotatable driven member in engagement with each other, and rollers disposed between the driven member and the housing. The drive member controls location of the rollers to restrict the driven member when the driven member rotates the drive member and to free the driven member when the drive member rotates the driven member. The spring can urge rollers in the axial direction, and no additional biasing means is necessary.

Since the motor section and the output section are connected by the clutch, they can be manufactured separately.

According to another feature of the invention, a motor comprising includes a motor housing having a plurality of permanent magnets, an armature having an armature shaft disposed in the motor housing, a worm mechanism having a worm shaft disposed coaxially with the armature shaft, and a one way clutch disposed between the armature shaft and the warm shaft. The clutch includes teeth members in engagement with each other, a plurality of rollers for controlling the teeth members, and a spring for not only holding the rollers but also urging the warm shaft to separate from the armature shaft.

The armature shaft can be also urged by permanent magnets to separate from the worm shaft. As a result, there is no interference between the armature shaft and the worm shaft, so that vibration can be eliminated.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS (First Embodiment)

A motor according to a first embodiment of the invention is described with reference to FIGS. 1–10.

Figure 10:
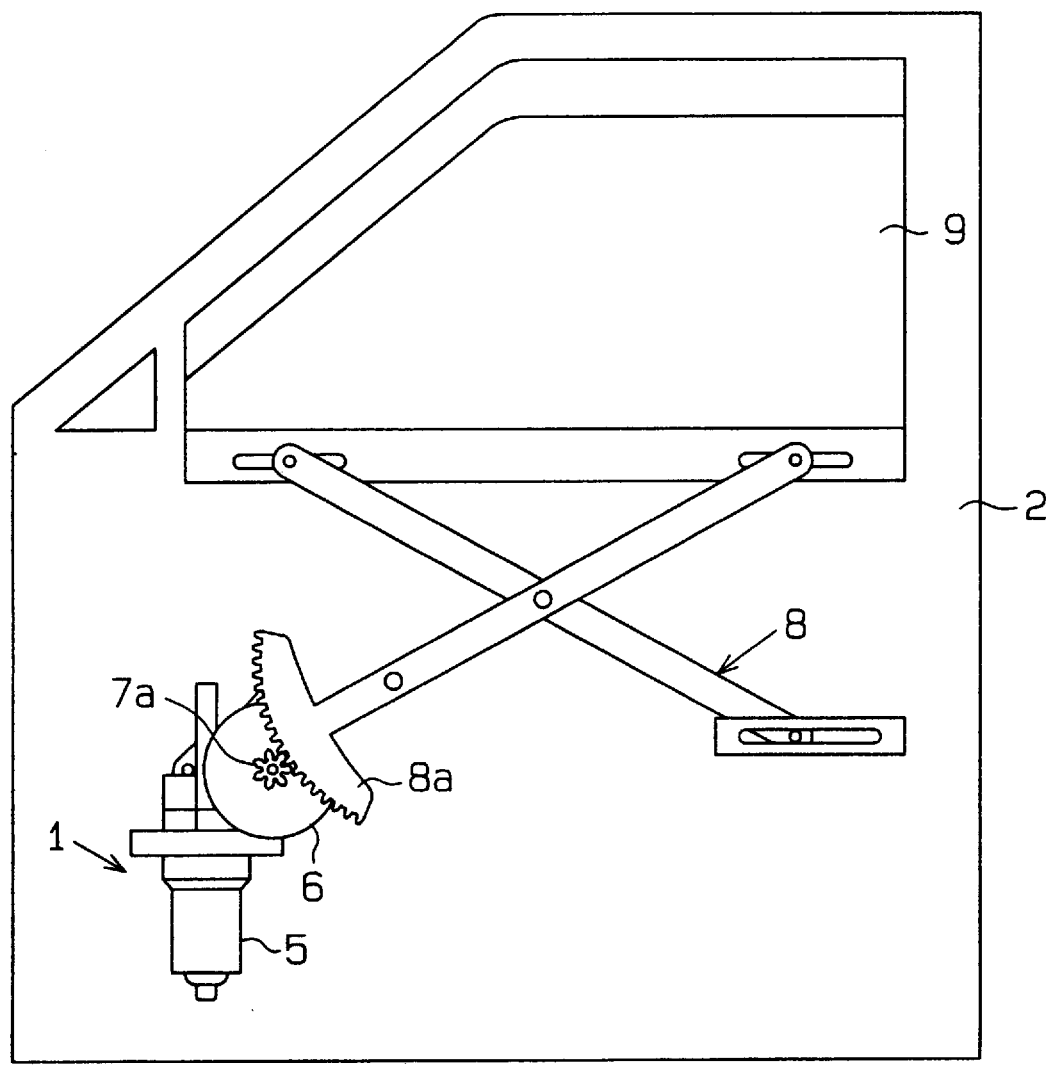
FIG. 10 is a schematic diagram illustrating a power window system for a vehicle.

As illustrated in FIG. 10, motor 1 is mounted in a power window system of a vehicle door 2. Motor 1 is comprised of motor section 5 and output section 6 which has output shaft 7. Rotation of motor section 5 is transmitted from gear 7a, which is formed on output shaft 7, via gear 8a which is formed on an arm of window regulator 8. Window regulator 8 opens window 9 if motor 1 rotates in one direction, while it closes window 9 if motor 1 rotates in the other direction.

Figure 2:
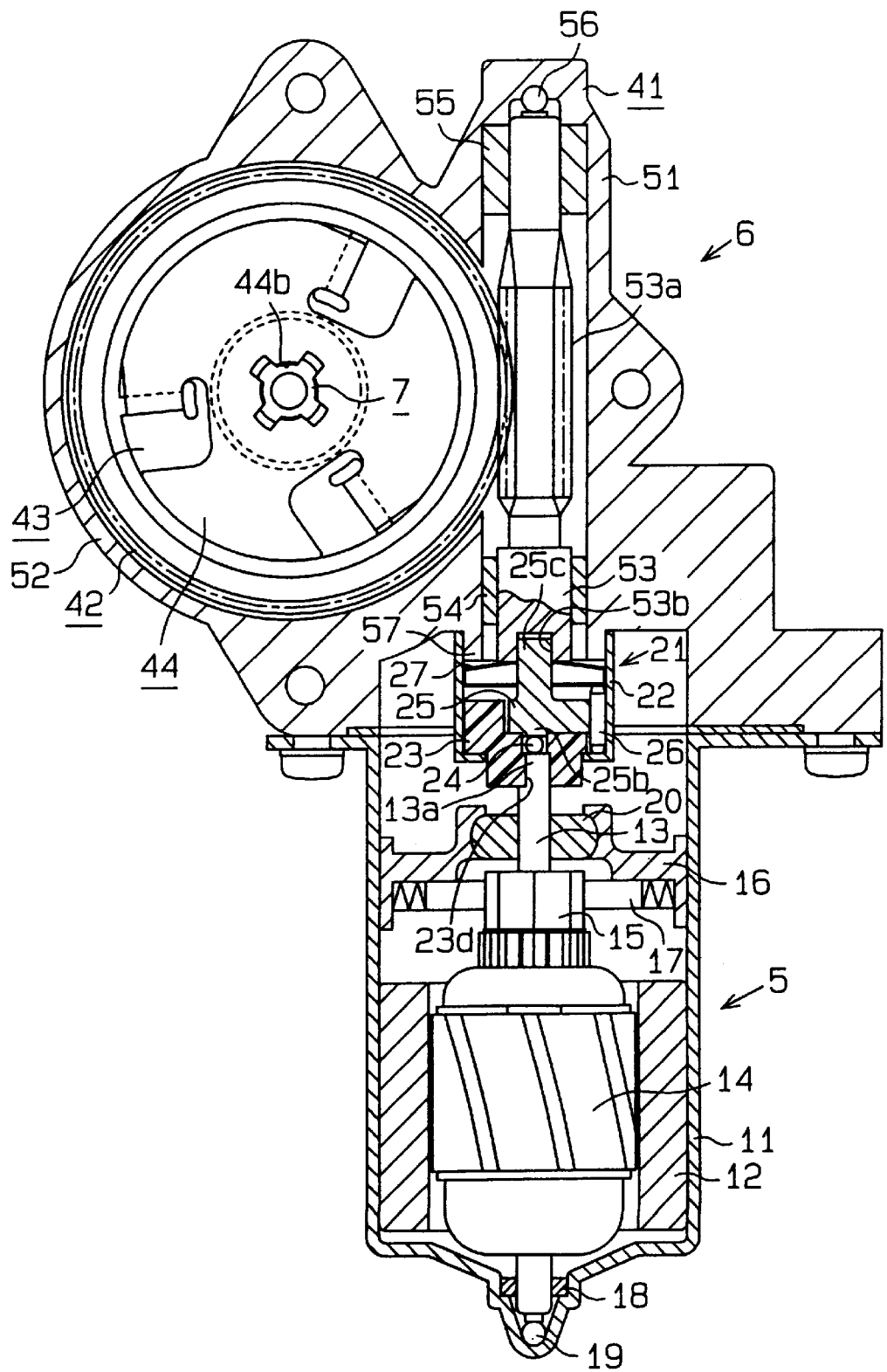
FIG. 2 is a cross-sectional longitudinal view of the motor according to the first embodiment.

As shown in FIG. 2, motor section 5 is comprised of cylindrical motor housing 11, a pair of permanent magnets 12, armature shaft 13, armature 14, commutator 15, brush holder 16 and a pair of brushes 17. Motor housing 11 has a bottom which supports armature shaft 13 via bearing 18 at the center thereof. The pair of permanent magnets 12 is fixed to opposite portions of the inner periphery of motor housing 11 around armature 14. Armature shaft 13 is supported by thrust bearing 19 at one end, and has D-shaped cut portion 13a at the other end thereof. Armature 14 is axially positioned in the magnetic field formed by permanent magnets 12 so that the end of armature shaft 13 can urge thrust bearing 19 downward in FIG. 2. Commutator 15 is fixed to the upper end of armature 14.

Motor housing 11 has an open end, to which brush holder 16 is force-fitted. Brush holder 16 has bearing 20 at the center thereof to rotatably support the other end of armature shaft 13.

The pair of brushes 17 is held in brush holder 16 to be in contact with commutator 15. Electric current is supplied to armature 14 by the pair of brushes 17 through commutator 15.

Figure 3:
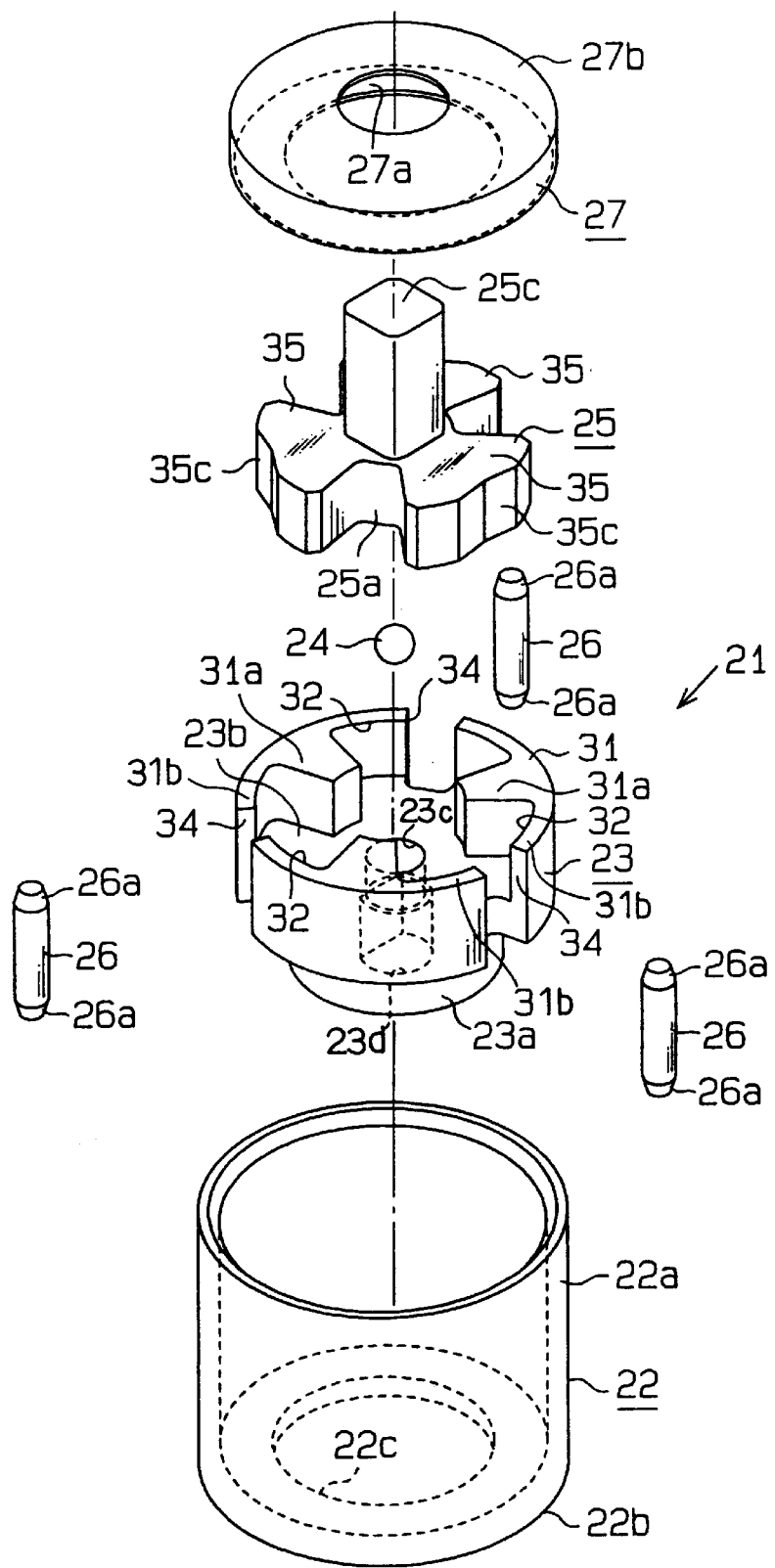
FIG. 3 is an exploded perspective view of a clutch of the motor according to the first embodiment.
Figure 4:
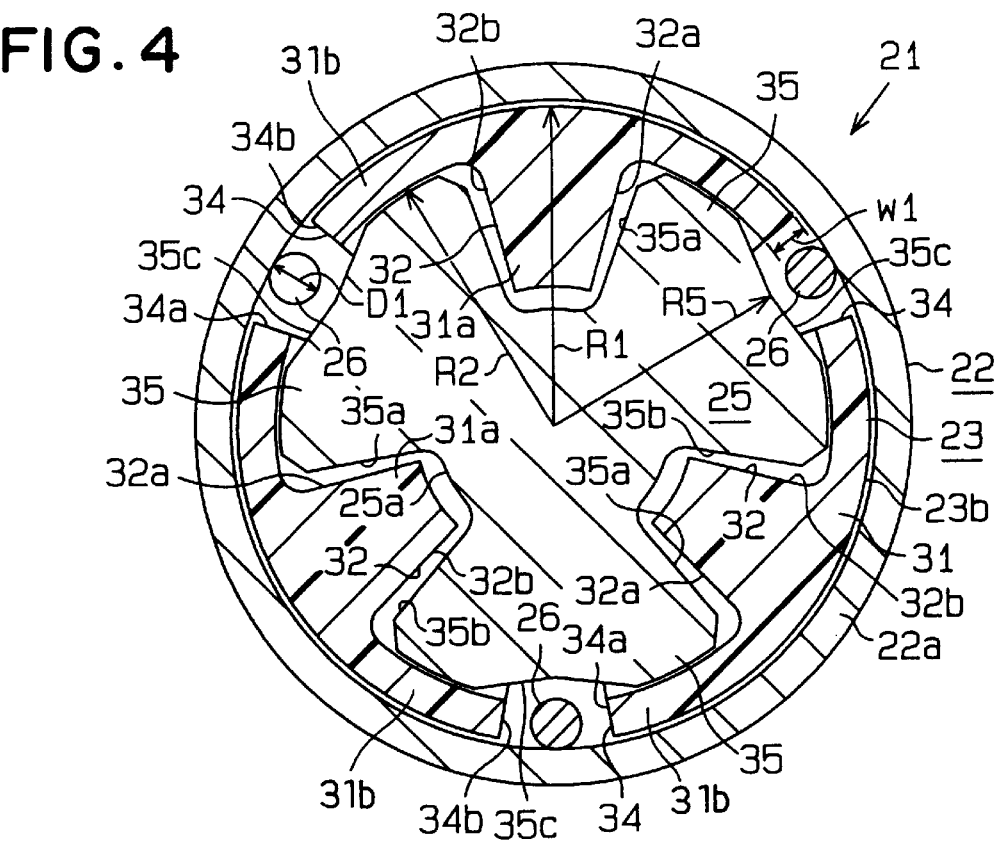
FIG. 4 is a cross-sectional plan view of the clutch.
Figure 5:
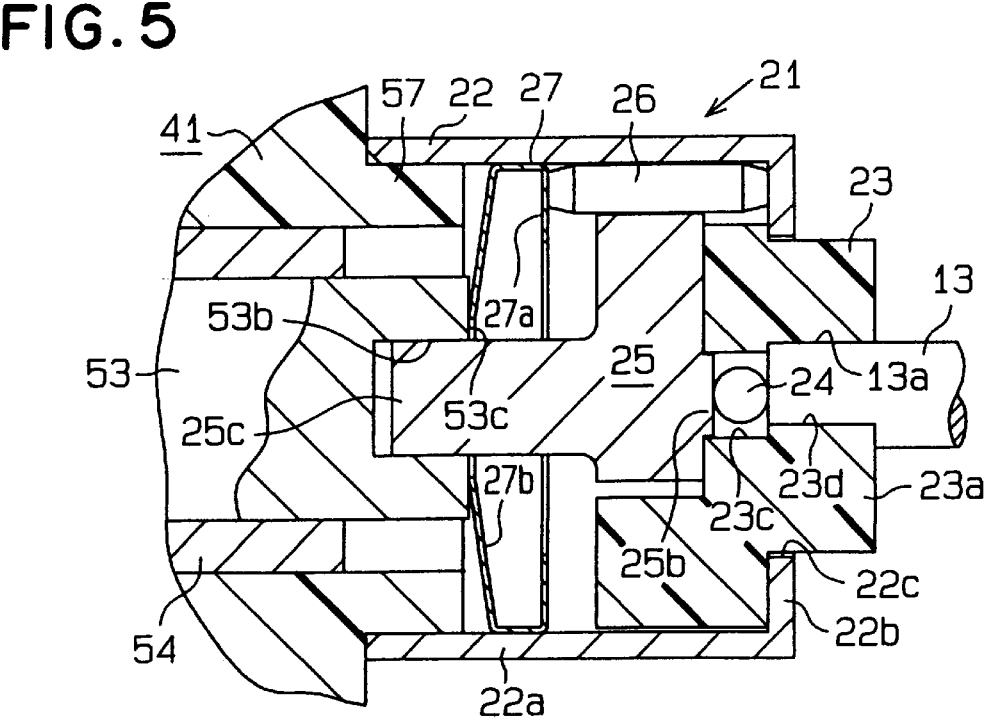
FIG. 5 is a cross-sectional side view of the clutch.

Clutch 21 is disposed at the front end of motor section 5. As shown in FIGS. 3–5, clutch 21 is comprised of clutch housing 22, resin-made drive member 23, steel ball 24, driven member 25, three rollers 26, and brass-made spring washer 27.

Clutch housing 22 has cylindrical outer wall 22a and bottom 22b having center hole 22c.

Drive member 23 has shaft portion 23a, female coupler portion 23b, and center hole 23c. Center hole 23c has D-shaped cut portion 23d at its lower half as shown in FIG. 3, so that D-shaped cut portion 13a of armature shaft can be fitted thereto. Accordingly, the motor rotation can be transmitted to drive member 23.

Female coupler portion 23b has three tooth members 31 and three slots 34 formed between tooth members 31, forming female coupling surface 32. Each tooth member 31 has internal tooth 31a and semi-cylindrical wall 31b. Internal tooth 31a extends inwardly from the middle of the wall to form first side surface 32a and second surface 32b on both sides of internal tooth 31a, as shown in FIG. 4. Each wall 31b has an outer periphery of radius R1 and an inner periphery of radius R2. Circumferential width of each slot 34 is wider than thickness W1, which is the difference between radiuses R1 and R2.

Driven member 25 has male coupler portion 25a, cylindrical shaft portion 25b, as shown in FIG. 5, extending from one end thereof, and generally square shaft 25c extending from the other end. Shaft 25c can be substituted by a shaft having D-shape or other angular cross-section.

Cylindrical shaft portion 25b is fitted to center hole 23c, after steel ball 24 is inserted therein, that is, between shaft portion 25b and armature shaft 13.

Male coupler portion 25a has fan-shaped three teeth 35 extending radially outward at circumferentially equal intervals. Each tooth 35 has semi-cylindrical outer periphery of radius R2, concave control surface 35c having the deepest bottom of radius R5 (which is smaller than R2) formed at the middle of the outer periphery. Each tooth 35 has a circumferential width that is smaller than the distance between teeth 31 of female coupler 23b, so that male coupler portion 25a, having first side surface 35a and second side surface 35b, can be loosely fitted into female coupling surface 32 between first side surface 32a and second side surface 32b thereof, as shown in FIG. 4. Cylindrical rollers 26 are respectively disposed in slots 34 to be parallel with the axis of center hole 23c in spaces between concave surface (or concave control surface) 35c of male coupler portion 25a and inner periphery of clutch housing 22. Each roller 26 has outside diameter D1 which is larger than thickness W1 of semi-cylindrical wall 31b and chamfered edges 26a, as shown in FIGS. 3 and 4. The width of tooth 35 is wider than the width of slot 34.

Drive member 23, coupled with driven member 25, is loosely fitted into clutch housing 22 with shaft portion 23a being rotatably inserted into center hole 22c.

Spring washer 27 has lower ring portion 27a and upper conical spring portion 27b. The outside diameter thereof is approximately equal to the inside diameter of clutch housing 22 so that spring washer 27 is force-fitted into clutch housing 22. Conical spring portion 27b has a center hole through which shaft 25c passes. Rollers 26 are axially held between bottom 22b of clutch housing 22 and spring washer 27.

The operation of clutch 21 will be described later.

Output section 6 is comprised of gear housing 41, gear wheel 42, rubber cushion 43, output plate 44, cover plate 45, and output shaft 7.

Gear housing 41 has worm housing portion 51, wheel housing portion 52, and flange 41a, which is connected to motor housing 11.

Worm housing portion 51 is a cylindrical member having a bottom at the upper end thereof. Worm housing portion 51 accommodates worm shaft 53 having worm 53a and supports the same at the upper and lower ends thereof via cylindrical sliding bearings 54 and 55. The upper end of worm shaft 53 is also supported by thrust bearing 56. The lower end of worm shaft 53 has generally square hole 53b, to which square shaft 25c of driven member 25 is fitted. Thus, worm shaft 53 is driven by driven member 25. Worm housing portion 51 also has cylindrical extension 57 at the lower end thereof near bearing 53. Cylindrical extension 57 is fitted into stationary clutch housing 22. The lower end of worm shaft 53 abuts conical spring portion 27b so that worm shaft 53 is urged by spring washer 27 toward thrust washer 56, as shown in FIGS. 2 and 5.

Wheel housing portion 52 is also a cylindrical member having a bottom which has cylindrical sliding wall 52a at the center thereof. Sliding wall 52a has center hole 52b to which output shaft 7 is rotatably inserted.

Gear wheel 42 has worm wheel portion 42a in mesh with worm 53a, cylindrical wall 42b formed at the center thereof, and three U-shaped partitions 42d formed around cylindrical wall 42b at equal intervals (i.e. 120 degree in angle). Cylindrical wall 42b has center hole 42c, to which sliding wall 52a is rotatably inserted. Partitions 42d define three compartments X which are circumferentially connected with each other by grooves Y.

Rubber cushion 43 has three fan-shaped cushion portions 43a and connection ring portion 43b. Each cushion portion 43a has radially extending groove 43c and is fitted to one of the compartments X, so that rubber cushion 43 can rotate together with gear wheel 42.

Figure 1:
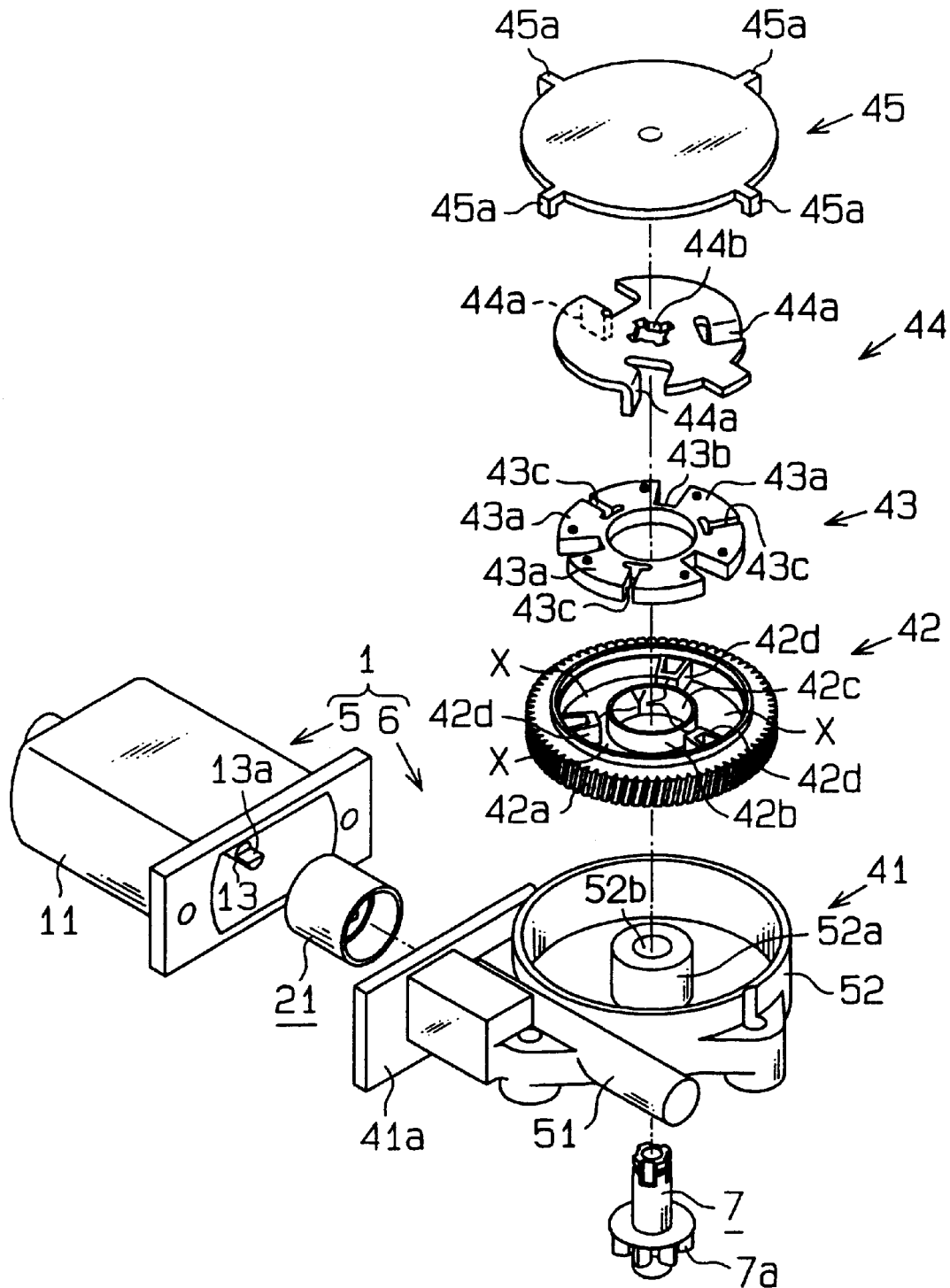
FIG. 1 is an exploded perspective view of a motor according to a first embodiment of the invention.

Output plate 44 is a metal plate which has three arms 44a cut therefrom to extend downward and center hole 44b, as shown in FIG. 1. Each arm 44a engages one of grooves 43c of rubber cushion 43, so that gear wheel 42 can rotate output plate 44 via rubber cushion 43. Center hole 44b has four notches formed at equal intervals so that the end of output shaft 7 is fitted thereto, as shown in FIG. 2. Thereafter, output shaft 7 is rotated by output plate 44.

Wheel housing portion 52 is covered by disk-like plate cover 45 having four claws 45a which extend radially outward. Each claw 45a is bent radially inward against the outer periphery of wheel housing portion 52. Accordingly, plate cover 45 restricts axial movement of output shaft 7.

Gear 7a of output shaft 7 meshes window regulator 8, as described previously.

The operation of clutch 21 is described with reference to FIGS. 6A–9B.

Figure 6A:
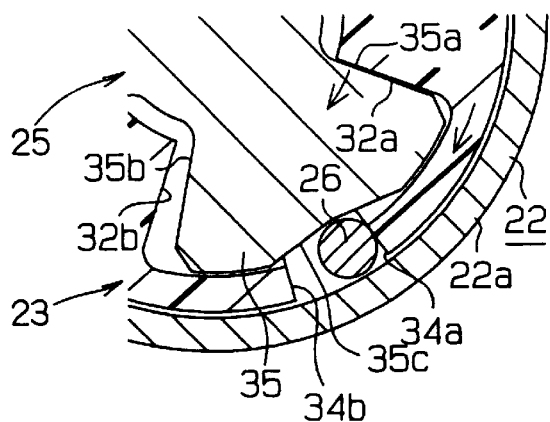
FIGS. 6A and 6B are fragmentary cross-sectional plan views of the clutch.
Figure 6B:
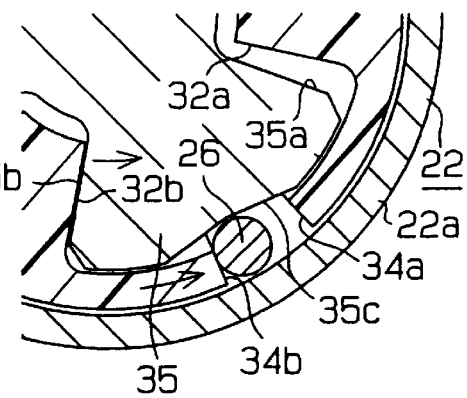

As shown in FIG. 6A, if drive member 23 rotates clockwise, and first side surface 32a of drive member 23 presses first side surface 35a of driven member 25, roller 26 abuts side surface 34a of the semi-cylindrical wall. If drive member 23 rotates counter-clockwise, and second side surface 32b of drive member 23 pushes second side surface 35b of driven member 25, roller 26 abuts side surface 34b of the semi-cylindrical wall. Thus, roller 26 is located at the middle of concave surface 35c. Although the outside diameter D1 of roller 26 is larger than the thickness W1 of the semi-cylindrical wall, roller 26 is movably disposed on the concave surface 35c, so that drive member 23 and driven member 25 can rotate relative to clutch housing 22. This condition is hereinafter referred to as neutral.

Figure 7A:
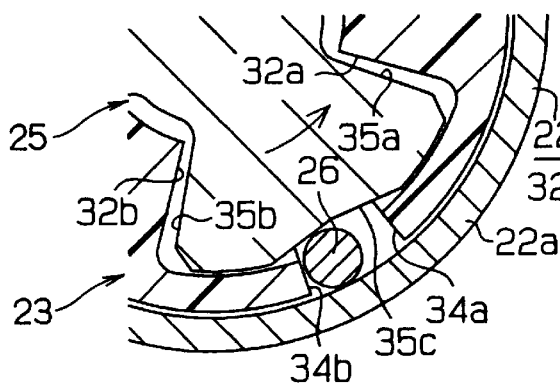
FIGS. 7A and 7B are fragmentary cross-sectional plan views of the clutch.
Figure 7B:
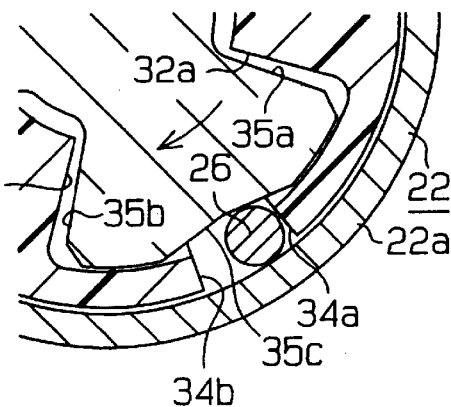

On the other hand, if driven member 25 rotates clockwise or counter-clockwise first, roller 26 is left behind the middle of concave surface 35c and sandwiched between concave surface 35c and the inner periphery of stationary clutch housing 22, as shown in FIGS. 7A and 7B. As a result, drive member 23 is not driven by driven member 25.

Figure 8A:
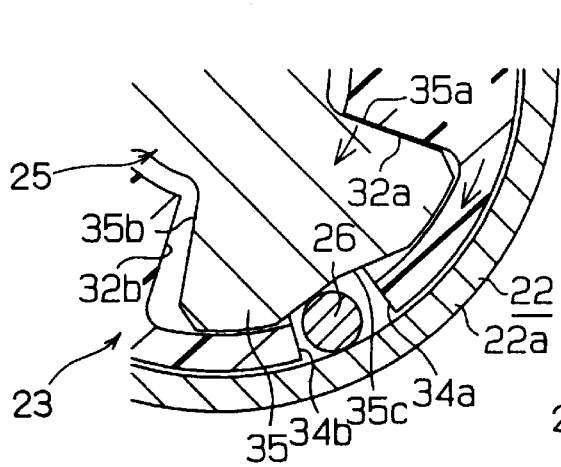
FIGS. 8A and 8B are fragmentary cross-sectional plan view of the clutch.

If motor 1 rotates clockwise when roller 26 is caught as shown in FIG. 7A, drive member 23 rotates clockwise so that first side surface 32a thereof pushes first side surface 35a of driven member 25, as shown in FIG. 8A. As a result, driven member 25, together with drive member 23, rotates clockwise, and roller 26 is freed. Roller 26 is controlled to stay neutral by side surfaces 34a and 34b of the semi-cylindrical walls.

Figure 9A:
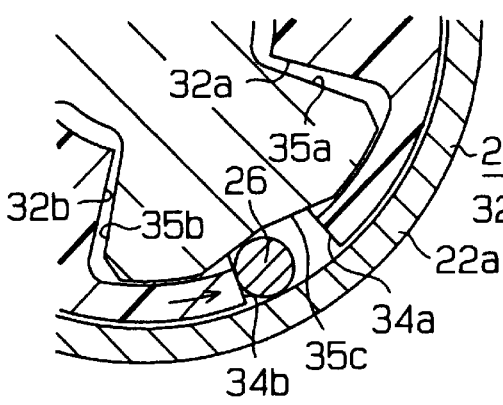
FIGS. 9A and 9B are fragmentary cross-sectional plan view of the clutch.

If motor 1 rotates counter-clockwise while roller 26 is caught as shown in FIG. 7A, drive member 23 rotates counter-clockwise so that side surface 34b of the semi-cylindrical wall pushes and frees roller 26, as shown in FIG. 9A. Then, second side surface 32b of drive member 23 pushes second side surface 35b of driven member 25 to rotate driven member 25 counter-clockwise. Thereafter, roller 26 is controlled to stay neutral by side surfaces 34a and 34b of the semi-cylindrical walls.

Figure 8B:
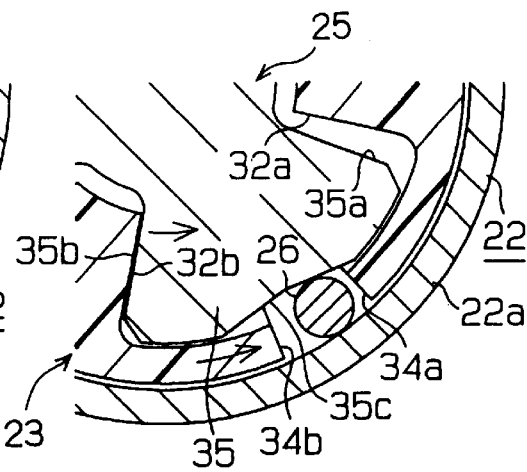

On the other hand, if motor 1 rotates counter-clockwise while roller 26 is caught as shown in FIG. 7B, drive member 23 rotates counter-clockwise so that second side surface 32b thereof pushes second side surface 35b of driven member 25, as shown in FIG. 8B. As a result, driven member 25, together with drive member 23, rotates counter-clockwise, and roller 26 is freed. Roller 26 is controlled to stay neutral by side surfaces 34a and 34b of the semi-cylindrical walls.

Figure 9B:
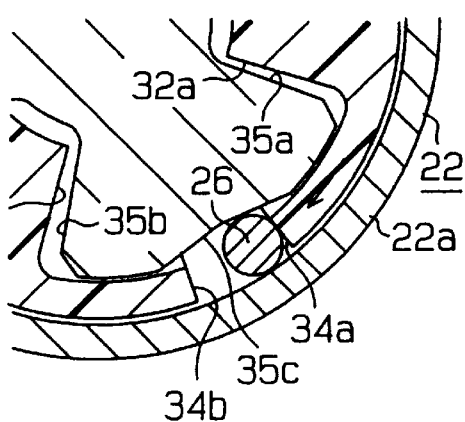

If motor 1 rotates clockwise while roller 26 is stopped as shown in FIG. 7B, drive member 23 rotates clockwise so that side surface 34a of the semi-cylindrical wall pushes roller 26 to be free, as shown in FIG. 9B. Then, first side surface 32a of drive member 23 pushes first side surface 35a of driven member 25 to rotate driven member 25 clockwise. Thereafter, roller 26 is controlled to stay neutral by side surfaces 34a and 34b of the semi-cylindrical walls.

If a force is exerted on a window pane of window 9, torque is transmitted through output shaft 7, output plate 44, rubber cushion 43, gear wheel 42, and worm shaft 53 to driven member 25. However, roller 26 is soon sandwiched between concave surface 35c and the inner periphery of clutch housing 22. As a result, driven member 25 is stopped from further rotating, and window is not opened further.

(Second Embodiment)

Figure 11:
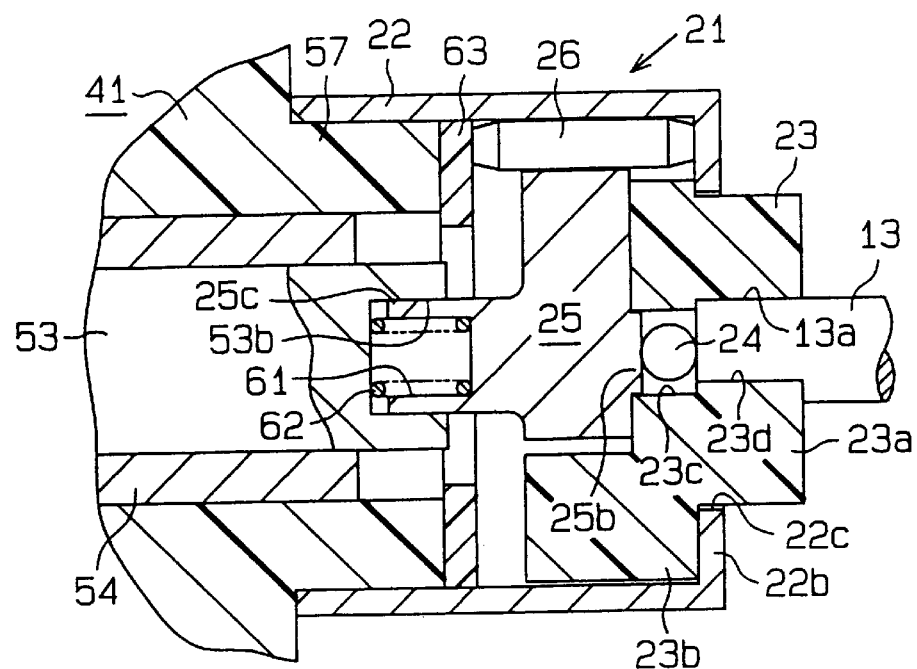
FIG. 11 is a fragmentary cross-sectional side view of a clutch of a motor according to a second embodiment of the invention.
Figure 12:
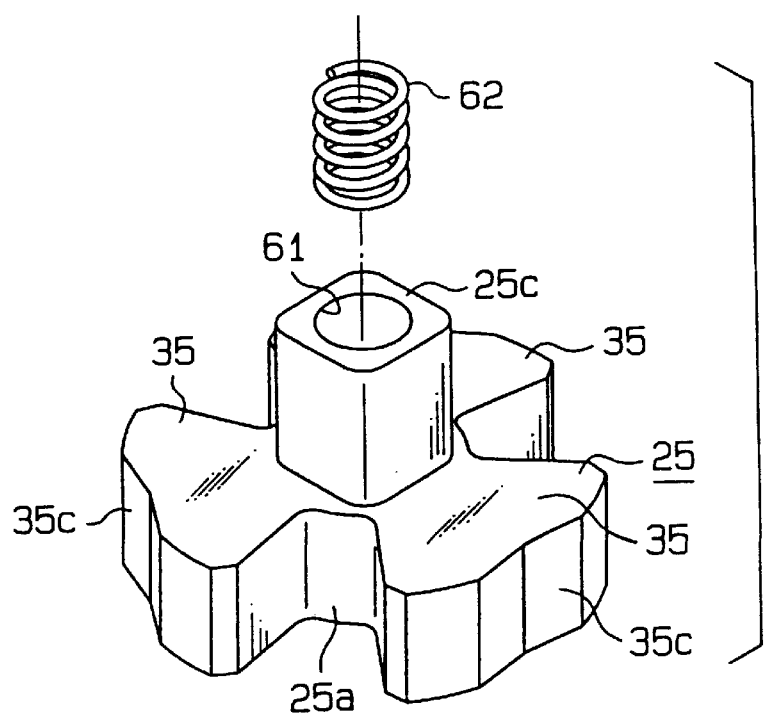
FIG. 12 is a perspective view of a driven member of a motor according to the second embodiment.

A motor according to a second embodiment of the invention is described with reference to FIGS. 11 and 12.

The same reference numeral as the first embodiment corresponds to the same or substantially the same portion or component.

Spring washer 27 is substituted by coil spring 62 and resinous retainer plate 63 in this embodiment. Square shaft 25c has spring chamber 61, which accommodates coil spring 62 within square hole 53b of worm shaft 53. Clutch housing 22 and driving member 23 are linked with each other at bottom 22b and female coupler 23b. Clutch housing 22 is fixed to cylindrical housing 57.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. A motor comprising:

a motor section including an armature and an armature shaft;

an output section including a worm mechanism having a worm shaft disposed coaxially with said armature shaft;

a spring urging said worm shaft to separate from said armature shaft, a clutch disposed between said armature shaft and said worm shaft, wherein said clutch includes a stationary housing, a driving member, a driven member in engagement with said driving member, and rollers disposed between said driven member and said housing, and said drive member control location of said rollers to restrict said driven member when said driven member rotates said drive member, and to free said driven member when said drive member rotates said driven member.

2. The motor as claimed in claim 1, wherein said driven member has a plurality of control surfaces, and each said roller is disposed between one of said plurality of control surfaces and said housing.

3. The motor as claimed in claim 2, wherein said control surface provides a different distance between said surface and said housing as said location of said roller changes.

4. The motor as claimed in claim 3, wherein said control surface has a concave surface.

5. The motor as claimed in claim 1, wherein said drive member has a plurality of surfaces engageable with said rollers.

6. The motor as claimed in claim 1, wherein said spring axially holds said rollers.

7. The motor as claimed in claim 1, wherein said spring is disposed in said housing.

8. The motor as claimed in claim 7, wherein said spring is a spring washer.

9. The motor as claimed in claim 1, wherein said spring is disposed between said worm shaft and said driven member.

10. The motor as claimed in claim 9, wherein said spring is a coil spring.

11. A motor comprising:

an armature having an armature shaft;

a worm mechanism having a worm shaft disposed coaxially with said armature shaft;

means for urging said worm shaft to separate from said armature shaft; and a one-way clutch disposed between said armature shaft and said worm shaft, wherein said one-way clutch includes a stationary member, a rotatable driving member, a rotatable driven member in engagement with said driving member, and rollers disposed between said driven member and said stationary member, and said drive member controls location of said rollers to restrict said driven member when said driven member rotates said drive member, and to free said driven member when said drive member rotates said driven member.

12. A motor comprising:

a motor housing having a plurality of permanent magnets;

an armature having an armature shaft disposed in said motor housing;

a worm mechanism having a worm shaft disposed coaxially with said armature shaft; and a one way clutch disposed between said armature shaft and said worm shaft, said clutch including a number of teeth members in engagement with each other, a plurality of rollers for controlling said teeth members, and a spring holding said rollers;

wherein said spring urges said worm shaft to separate from said armature shaft.

13. The motor as claimed in claim 12, wherein said armature is positioned in said motor housing so that said armature shaft is urged axially inward.

14. The motor as claimed in claim 13, wherein said spring comprises a compression coil spring disposed between said worm shaft and said driven shaft.

* * * * *